United States Patent

Taniguchi et al.

[11] Patent Number: 5,349,496
[45] Date of Patent: Sep. 20, 1994

[54] CHIP-TYPE SOLID ELECTROLYTIC CAPACITOR

[75] Inventors: Hiromichi Taniguchi; Yoshihiko Saiki, both of Tokyo, Japan

[73] Assignee: NEC Corporation, Tokyo, Japan

[21] Appl. No.: 25,874

[22] Filed: Mar. 3, 1993

[30] Foreign Application Priority Data

Mar. 3, 1992 [JP] Japan .................... 4-045088

[51] Int. Cl.[5] .................................... H01G 9/04
[52] U.S. Cl. ...................... 361/528; 361/540
[58] Field of Search .......... 29/25.03; 361/523, 524, 361/525, 528, 529, 532, 533, 534, 538, 539, 540, 508, 509, 510

[56] References Cited

U.S. PATENT DOCUMENTS

| | | | |
|---|---|---|---|
| 4,203,194 | 5/1980 | McGrath. | |
| 5,036,434 | 7/1991 | Kobayashi | 361/540 |
| 5,142,452 | 8/1992 | Saiki | 361/540 |
| 5,254,137 | 10/1993 | Mitani | 29/25.03 |

FOREIGN PATENT DOCUMENTS

| | | | |
|---|---|---|---|
| 2301115 | 12/1990 | Japan | 361/523 |
| 4264709 | 9/1992 | Japan | 361/523 |

*Primary Examiner*—Bruce A. Reynolds
*Assistant Examiner*—Gregory L. Mills

[57] ABSTRACT

The invention relates to a chip-type solid elelctrolytic capacitor which uses a capacitor element having an anode lead protruding from one end face of an anode body of a valve metal. The capacitor element is covered by an insulating resin cover layer except a cathode end face and the protruding part of the anode lead. A cathode terminal is formed on the cathode end face and the resin cover layer in an area near the cathode end face, and an anode terminal is formed on the resin cover layer so as to make contact with the protruding anode lead. The anode terminal is made up of a conductive layer which is formed on the resin cover layer only in a limited area so as not to make contact with the anode lead and has a microscopically rough surface, a plating layer which is formed on the conductive layer and the resin cover layer in the area over the aforementioned end face of the anode body and covers the protruding anode lead and a solder layer formed on the plating layer. In the anode terminal the rough surface of the conductive layer enhances the adhesion of the overlaid plating layer, and the separation of the conductive layer from the anode lead eliminates the problem about different thermal expansion coefficients of the conductive layer and the anode lead. Therefore, when the chip-type capacitor is mounted on a printed circuit board the bonding strength is enhanced.

4 Claims, 2 Drawing Sheets

CHIP-TYPE SOLID ELECTROLYTIC CAPACITOR

BACKGROUND OF THE INVENTION

This invention relates to a chip-type solid electrolytic capacitor having an improved anode terminal.

In conventional chip-type solid electrolytic capacitors, the capacitor element is enclosed in an insulating resin cover layer. Usually the capacitor element uses a cylindrical (or prismatic) anode body made of a valve metal such as tantalum or aluminum, and a pin-like anode lead made of the same valve metal is planted into the anode body so as to protrude from one end face of the anode body. On the opposite end face and the cylindrical side face of the anode body there is a dielectric oxide layer formed by an anodization process, and the dielectric oxide layer is overlaid with a solid electrolyte layer, which is overlaid with a cathode conductor layer.

In rather primitive chip-type solid electrolytic capacitors, an external anode lead is soldered to the anode lead of the capacitor element and an external cathode lead to the cathode conductor layer of the element, and an insulating resin cover layer is formed by transfer molding so as to tightly enclose the entirety of the capacitor element except the extended end portions of the external anode and cathode leads. A disadvantage of this construction is the lowness of volumetric efficiency because of bulkiness of the resin cover layer in which the joints of the anode and cathode leads are embedded together with the capacitor element.

With the aim of reducing the overall size of a chip-type solid electrolytic capacitor and thereby raising volumetric efficiency, it has already been proposed to first cover the capacitor element with an insulating resin cover layer so as to leave the protruding anode lead and the cathode conduct layer on the opposite end face exposed and then form an anode terminal on the resin cover layer so as to make direct contact with the anode lead and a cathode terminal over the opposite end area so as to make direct contact with the exposed area of the cathode conductor layer. The anode terminal has a three-layer structure consisting of a conductive layer which lies on the surface of the resin cover layer and adheres to the protruding anode lead, a plating layer formed on the conductive layer and a solder layer on the plating layer. The conductive layer is formed by a thick-film process using a conductive paste. The overlying plating layer makes good adhesion to this conductive layer.

However, the anode terminal of the above described three-layer structure has a shortcoming. That is, the thermal expansion coefficient of the conductive layer (formed by using a conductive paste containing a binding resin) is larger than that of the anode lead (valve metal) by a factor of more than 10, so that there is a possibility of partial peeling of the conductive layer from the anode lead. Therefore, the electrical connection between the anode lead and the anode terminal is not sufficiently high in reliability, and there is a possibility of an increase in the dielectric loss of the capacitor.

To solve the above explained problem, there is a proposal of modifying the three-layer structure of the anode terminal to a two-layer structure by omitting the conductive layer. That is, in the modified anode terminal a plating layer makes direct contact with the anode lead, and the resin cover layer is overlaid with a solder layer. In this case there is little problem about the electrical connection between the anode Lead and the plating layer. However, the strength of adhesion of the anode terminal to the resin cover layer becomes weak since the plating layer is formed directly on a very smooth surface of the resin layer formed by molding. Therefore, when the chip-type capacitor is mounted on a printed circuit board by soldering the bonding strength of the capacitor chip is not sufficiently high.

SUMMARY OF THE INVENTION

It is an object of the present invention to provide a chip-type solid electrolytic capacitor which uses a conventional capacitor element and has an improved anode terminal which makes good and reliable connection with the anode lead of the capacitor element and exhibits enhanced bonding strength when the capacitor is mounted on a printed circuit board.

A chip-type solid electrolytic capacitor according to the invention comprises (i) a capacitor element comprising an anode body, which is made of a valve metal and has a first end face, an opposite second end face and a side face extending from the perimeter of the first end face to the perimeter of the second end face, a pin-like anode lead which is made of the valve metal and planted into the anode body so as to protrude from the first end face, a dielectric oxide layer formed on the second end face and the side face of the anode, body, a solid electrolyte layer formed on the dielectric oxide layer and a cathode conductor layer formed on the solid electrolyte layer, (ii) an insulating resin cover layer formed on the capacitor element so as to enclose the capacitor element except a protruding part of the anode lead and a cathode end face over the second end face of the anode body, (iii) a cathode terminal which is formed on the cathode end face of the capacitor element and on the resin cover layer in an area near the cathode end face, and (iv) an anode terminal comprising a conductive to layer which is formed on the resin cover layer in an area near the first end face of the anode body so as not to make contact with the anode lead and has a microscopically rough surface, a plating layer which is formed on the conductive layer and on the resin cover layer in an area near and over the first end face of the anode body and extends to the surface of the protruding part of the anode lead and a solder layer formed on the plating layer.

Thus, in the anode terminal according to the invention the conductive layer is absent in an area very close to the anode lead. When the capacitor element has a cylindrical shape as is usual, the conductive layer may be formed only on a cylindrical surface of the resin cover layer so as not extend into a circular area over the anodic end face of the capacitor element. Consequently the plating layer in the anode terminal makes direct contact with the anode lead, and a marginal region of the plating layer adheres to the conductive layer having a microscopically rough surface.

The separation of the conductive layer in the anode terminal from the anode lead of the capacitor element solves the problem about different thermal expansion coefficients of the anode lead and the conductive layer and, hence, enhances the reliability of the electrical connection of the anode terminal to the anode lead. The existence of the conductive layer having a microscopically rough surface under a suitable area of the plating layer solves the problem about insufficient strength of adhesion of the plating layer to the insulating resin cover layer. Therefore, when the chip-type capacitor is mounted on a printed circuit board by soldering the anode terminal according to the invention exhibits enhanced bonding strength.

DESCRIPTION OF THE PREFERRED EMBODIMENTS

Figure 1:
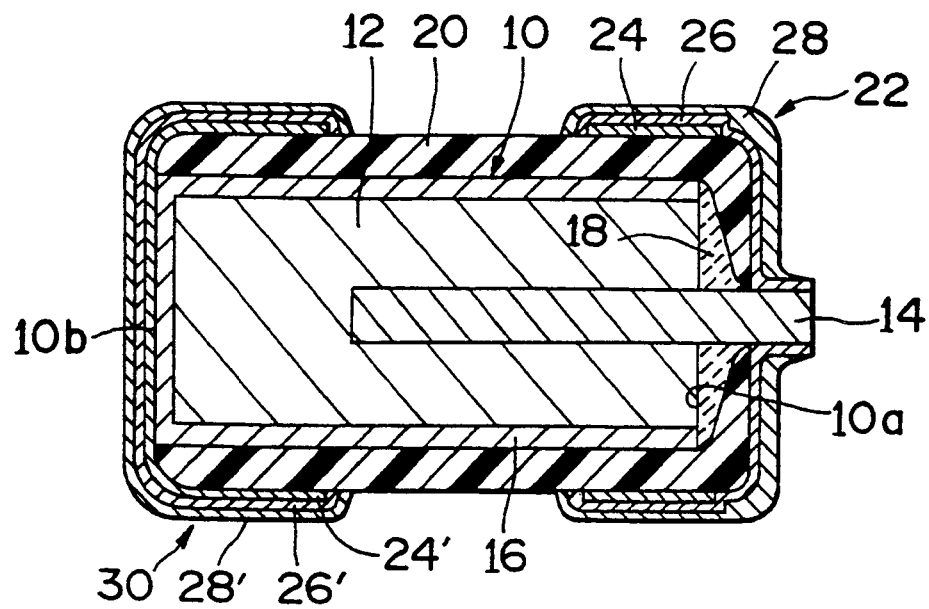
FIG. 1 is a longitudinal sectional view of a chip-type solid electrolytic capacitor in which the invention is embodied.

FIG. 1 shows a chip-type solid electrolytic capacitor as an embodiment of the invention. This capacitor is an assembly of a conventional capacitor element 10 which is cylindrical and has an anode lead 14 in the form of a pin protruding from one end face 10a, an insulating resin cover layer 20, an anode terminal 22 according to the invention and a cathode terminal 30 of known construction. For convenience, the end face 10a of the capacitor element 10 will be referred to as anode end face and the opposite end face 10b of the capacitor element as cathode end face.

Figure 2:
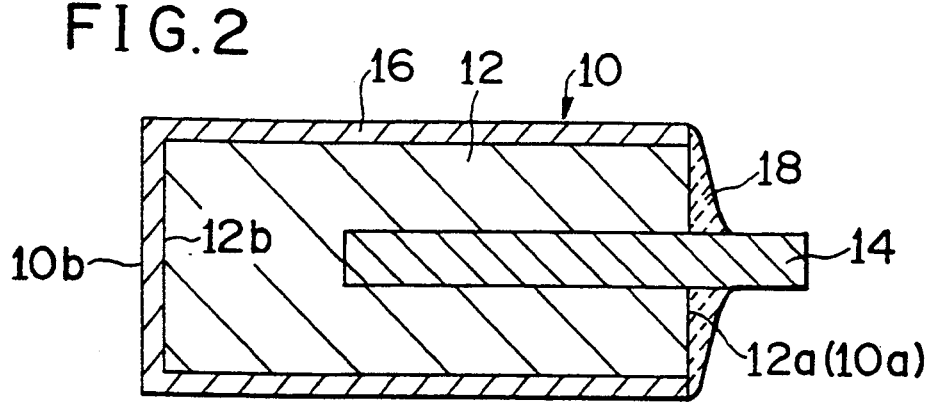
FIG. 2 is a longitudinal sectional view of a capacitor element used in the chip-type solid electrolytic capacitor of Fig. 1.
Figure 3:
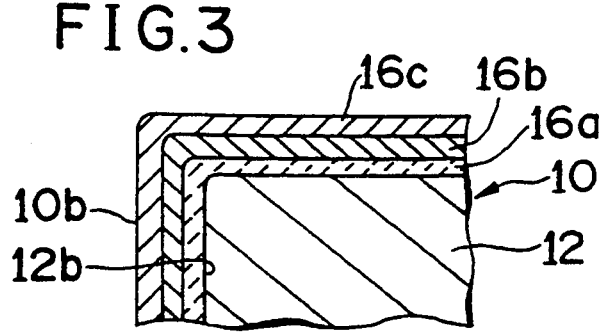
FIG. 3 is a partial and explanatory enlargement of the capacitor element of FIG. 2.

Referring to FIGS. 2 and 3, the major part of the capacitor element 10 is a cylindrical anode body 12 which is formed of a valve metal such as, for example, tantalum or aluminum. The pin-like anode lead 14 is made of the same valve metal and firmly planted into the anode body 12 so as to protrude from the center of one end face 12a of the cylindrical body 12. A capacitance and cathode part 16 of the capacitor element 10 is formed on the outer surfaces of the anode body 12 except the end face 12a, i.e. on the opposite end face 12b and the cylindrical side surface of the anode body 12. First a dielectric oxide film 16a is formed on the anode body 12 surfaces by anodizing the anode body 12. Next a solid electrolyte layer 16b (e.g. manganese dioxide layer) is formed on the dielectric oxide film 16a, and then a cathode conductor layer 16c on the solid electrolyte layer 16b. The end face 12a of the anode body 12 becomes the anode end face 10a of the capacitor element 10. This end face 12a (10a) is coated with a protective layer 18. On the opposite end the cathode conductor layer 16c provides the cathode end face 10b of the capacitor element 10.

The insulating resin cover layer 20 is formed on the cylindrical outer surface of the capacitor element 10 and also over the anode end face 10a. The resin cover layer 20 does not cover the cathode end face 10b of the capacitor element 10.

The anode terminal 22 is formed on the insulating resin cover layer 20 in a region near the anode end face 10a of the capacitor element 10. The anode terminal 22 is a combination of a conductive layer 24 which is in contact with the resin cover layer 20, a plating layer 26 and a solder layer 28 which is the outer surface layer. In this embodiment, the conductive layer 24 is a cylindrical layer formed over an end region of the capacitor element 10 near the anode end face 10a. That is, the conductive layer 24 does not exist in a circular area over the anode end face 10a of the capacitor element 10. In the circular area over the anode end face 10a the plating layer 26 makes direct contact with the resin cover layer 20 and covers the surface of the protruding anode lead 14, and the plating layer 26 extends to the cylindrical area contiguous to the circular area so as to cover the conductive layer 24. The solder layer 28 covers the entire area of the plating layer 26.

In this anode terminal 22 the conductive layer 24 is incorporated in order to firmly bond the plating layer 26 to the resin cover layer 20. A preferred material of the conductive layer 24 is a mixture of a metal powder and/or carbon powder and a binding resin, and it is suitable to form the conductive layer 24 by applying a conductive paste containing the conductive powder(s) and the resin. To enhance the adhesion of the overlaid plating layer 26 to the conductive layer 24, the conductive layer 24 must have a microscopically rough surface. A surface roughness of a few microns to tens of microns is suitable. Such a surface roughness of the conductive layer can be realized by adding a filler powder of a suitable particle size to the aforementioned conductive paste. An alternative way of realizing an adequately rough surface of the conductive layer 24 is making the conductive layer 24 porous.

In the anode terminal 22 according to the invention it is essential that the conductive layer 24 does not make contact with the anode lead 14. From a practical point of view, it is expedient to form the conductive layer 24 so as not to extend into the circular area over the anode end face 10a of the capacitor element 10, as shown in FIG. 1. However, it is permissible that the conductive layer 24 extends into the circular area in question on condition that the conductive layer 24 never comes into contact with the anode lead 14.

The plating layer 26 should be formed of a metal having a thermal expansion coefficient close to that of the anode lead 14.

The cathode terminal 30 has a known three-layer structure made up of a conductive layer 24' which is the inner layer, a plating layer 26' and a solder layer 28' which is the outer surface layer. The conductive layer 24' covers the cathode end face 10a of the capacitor element 10 and a cylindrical area of the resin cover layer 20 near the cathode end face 10b. Usually tile conductive layer 24' is similar to the conductive layer 24 of the anode terminal 22. The plating layer 26' covers the entire area of the conductive layer 24', and the solder layer 28' covers the entire area of the plating layer 26'.

Figure 4:
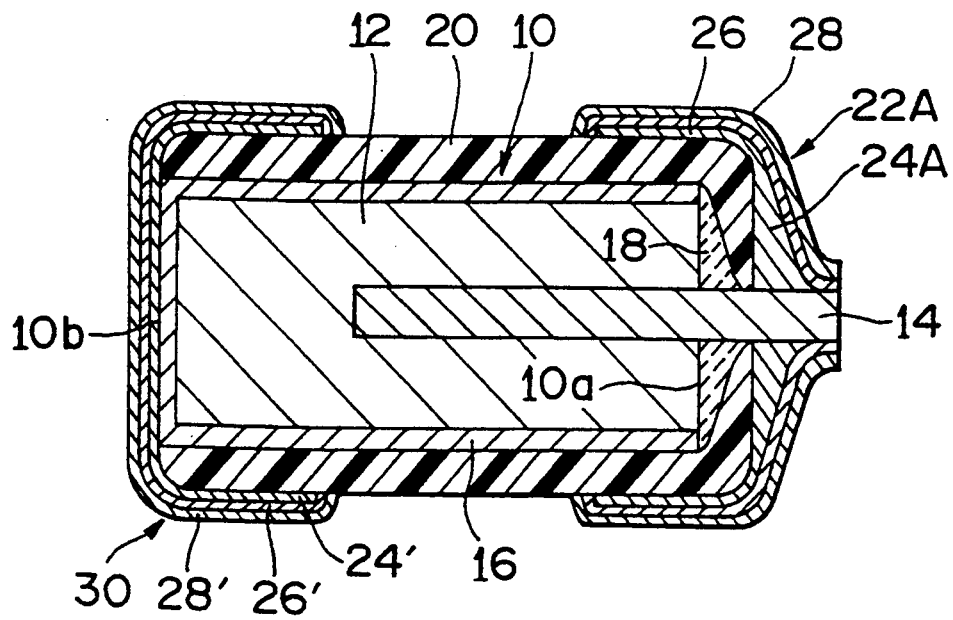
FIG. 4 is a longitudinal sectional view of a known chip-type solid electrolytic capacitor.

For comparison, FIG. 4 shows a chip-type solid electrolytic capacitor having an anode terminal 22A of a three-layer structure. This capacitor uses the same capacitor element 10 as the capacitor of FIG. 1 and has the same construction as the capacitor of FIG. 1 except the structure of the anode terminal 22A. This anode terminal 22A has a conductive layer 24A which is formed on a circular area of the resin cover layer 22 over the anode end face 10a of the capacitor element 10 so as to cover the surface of the protruding anode lead 14 and extends to a cylindrical area near the end face 10a. The conductive layer 24A is covered by a plating layer 26, which is covered by a solder layer 28. In this anode terminal 22A the conductive layer 24A contributes to the electrical connection of the outer solder layer 28 with the anode lead 14. However, as mentioned hereinbefore, the connection of the conductive layer 24A to the anode lead 14 is not high in reliability because the thermal expansion coefficient of the conductive layer 24A is far larger than that of the anode lead 14.

Figure 5:
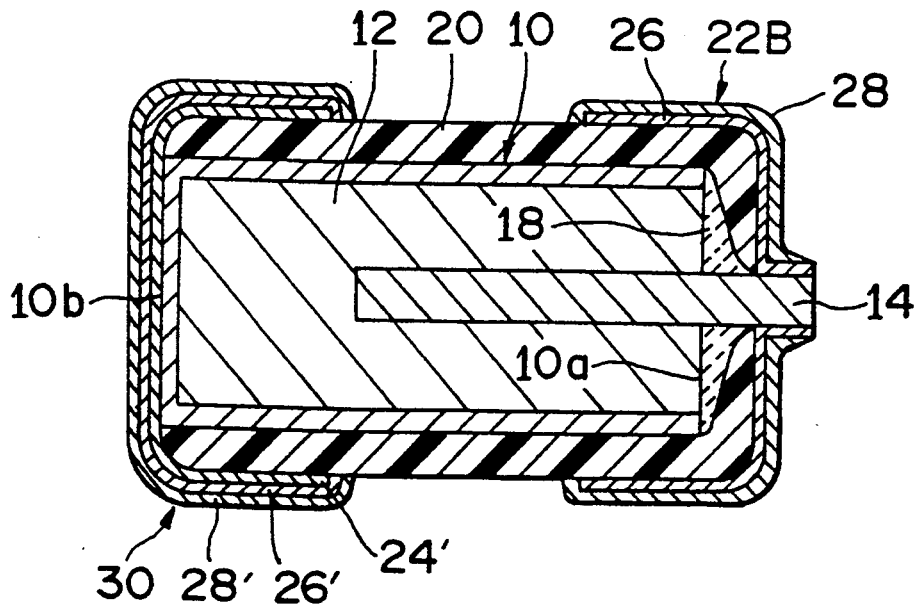
FIG. 5 is a longitudinal sectional view of another known chip-type solid electrolytic capaciator.

FIG. 5 shows a known modification of the anode terminal 22A in FIG. 4. The anode terminal 22B in FIG. 5 has a two-layer structure consisting of a plating layer 26 which is in direct contact with the resin cover layer 20 and the protruding part of the anode lead 14 and a solder layer 28 which covers the plating layer 26. That is, in this modification the conductive layer 24A shown in FIG. 4 is entirely omitted. In this case the connection of the plating layer 26 to the anode lead 14 is reliable. However, the strength of adhesion of the plating layer 26 to the resin layer 20 is not always sufficiently high. Therefore, when the chip-type capacitor is mounted on a printed circuit board by soldering the bonding strength may not be sufficiently high.

EXAMPLE 1

The chip-type solid electrolytic capacitor of FIG. 1 was produced by the following process.

The capacitor element 10 was produced by a conventional process and tightly covered by the resin cover layer 20 except the cathode end face 10b and the protruding part of the anode lead 14.

To form the conductive layer 24 of the anode terminal 22, a conductive paste was prepared by mixing an epoxy resin, a curing agent for the epoxy resin, a fine powder of carbon, a fine powder of palladium and a calcium carbonate powder ranging from 5 to 20 μm in particle size and diluting the mixture with a small amount of an organic solvent. The paste was applied to the surface of the resin cover layer 20 only in a cylindrical area near the anode end face 10a of the capacitor element 10, and the applied paste was heat cured at 150°–200° C. for about 30 min to thereby form the conductive layer 24.

The conductive layer 24' of the cathode terminal 30 was formed by using the same paste and the same method.

In preparation for the formation of the plating layer 26 of the anode terminal 22, a solution of an amine compound of palladium in butyl acetate was applied to the surface of the resin layer 20 in the circular area over the anode end face 10a and the protruding anode lead 14, and the palladium compound in the applied solution was thermally decomposed by heating at 185° C. for 30 min to thereby deposit fine particles of palladium (which serves as a metal catalyst) on resin layer 20 and anode lead 14. After that the plating layer 26 was formed by an electroless plating method on the surfaces havid the palladium particles. At the same time the plating layer 26' of the cathode terminal 30 was formed on the conductive layer 24'.

Then the solder layer 28 of the anode terminal 22 was formed on the plating layer 26, and the solder layer 28' of the cathode layer 30 on the plating layer 26'. After that the protruding part of the anode lead 14 was cut into a predetermined short length.

To make a comparative test, 50 samples of the capacitor of FIG. 1 were produced by the above described process.

For comparison, 50 samples of the chip-type solid electrolytic capacitor of FIG. 5 (with the anode terminal 22B of the two-layer structure) were produced by using the same capacitor element 10 and the same materials as in Example 1.

The samples of the two kinds of capacitors were each mounted on a printed circuit board by soldering, and the bonding strength of the anode terminal of every sample was measured. As for the capacitor of FIG. 1 (Example 1 of the invention) the bonding strength was 2.8 kgf on the average of 50 samples. As for the capacitor of FIG. 5 the bonding strength was 1.3 kgf on the average of 50 samples.

EXAMPLE 2

The chip-type solid electrolytic capacitor of Example 1 (FIG. 1) was modified only in the structure of the conductive layers 24, 24' of the anode and cathode terminals 22, 30.

In this example a conductive paste for forming the conductive layers 24, 24' was prepared by mixing an epoxy resin, a curing agent for the epoxy resin, a fine powder of carbon, a fine powder of palladium and a foaming agent and diluting the mixture with an organic solvent. That is, a foaming agent was used in place of the filler (calcium carbonate) particles in Example 1. In forming the conductive layer 24, the paste applied to the surface of the resin layer 20 was heat cured by heating at 120° C. for about 1 h. This heat treatment also induced foaming action of the foaming agent, so that the cured conductive layer 24 had a porous structure with innumerable pores or pin-holes having diameters of 5-20 μm. By the same method the conductive layer 24' of the cathode terminal 30 was made porous.

Samples of the capacitor of Example 2 were mounted on a printed circuit board by soldering, and the bonding strength of the anode terminal of every sample was measured. In this case the bonding strength was 2.7 kgf on the average of 50 samples.

What is claimed is:

1. A chip-type solid electrolytic capacitor, comprising:

a capacitor element comprising an anode body which is made of a valve metal and has a first end face, an opposite second end face and a side face extending from the perimeter of the first end face to the perimeter of the second end face, a pin-like anode lead which is made of said valve metal and planted into the anode body so as to protrude from said first end face, a dielectric oxide layer formed on said second end face and said side face of the anode body, a solid electrolyte layer formed on said dielectric oxide layer and a cathode conductor layer formed on said solid electrolyte layer;

an insulating resin cover layer formed on the capacitor element so as to enclose the capacitor element except a protruding part of said anode lead and a cathode end face over said second end face of the anode body;

a cathode terminal which is formed on said cathode end face of the capacitor element and on said resin cover layer in an area near said cathode end face; and an anode terminal comprising a conductive layer which is formed on said resin cover layer in an area near said first end face of the anode body, said conductive layer being spaced from the anode lead so as to prevent contact of said conductive layer with the anode lead and having a microscopically rough surface, a plating layer which is formed on said conductive layer and on said resin cover layer in an area near and over said first end face of the anode body and extends to the surface of the protruding part of the anode lead and a solder layer formed on said plating layer, said conductive layer of said anode terminal comprising a powder of a conductive substance, a binding resin and a particulate filler which contributes to the formation of said microscopically rough surface.

2. A capacitor according to claim 1, wherein said anode body has a cylindrical shape, said plating layer and said conductive layer of said anode terminal being formed such that said conductive layer formed on said resin cover layer terminates at said area near which said plating layer is formed on said resin cover layer over said first end face of the anode body.

3. A capacitor according to claim 1, wherein the surface roughness of said conductive layer of said anode terminal is from about 5 $\mu$m to about 20 $\mu$m.

4. A capacitor according to claim 1, wherein said cathode terminal has a three-layer structure consisting of a conductive layer which is in contact with said cathode end face of the capacitor element and said resin cover layer and has a microscopically rough surface, a plating layer formed on the conductive layer and a solder layer formed on the plating layer.

* * * * *